US009932732B1

(12) United States Patent
Batten et al.

(10) Patent No.: US 9,932,732 B1
(45) Date of Patent: Apr. 3, 2018

(54) PASSIVE GREASE TRAP WITH LIFT SYSTEM

(71) Applicant: Thermaco, Inc., Asheboro, NC (US)

(72) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 945 days.

(21) Appl. No.: 14/277,400

(22) Filed: May 14, 2014

Related U.S. Application Data (60) Provisional application No. 61/825,228, filed on May 20, 2013.

(51) Int. Cl.
| | | |
|---|---|---|
| C02F 1/00 | (2006.01) |
| E03F 5/16 | (2006.01) |
| B01D 21/24 | (2006.01) |
| B01D 17/02 | (2006.01) |
| B01D 21/02 | (2006.01) |
| B01D 17/00 | (2006.01) |

(52) U.S. Cl.
CPC ............ *E03F 5/16* (2013.01); *B01D 17/0211* (2013.01); *B01D 17/0214* (2013.01); *B01D 21/02* (2013.01); *B01D 21/2405* (2013.01); *B01D 21/2433* (2013.01); *B01D 17/00* (2013.01); *B01D 17/0208* (2013.01); *B01D 2221/02* (2013.01)

(58) Field of Classification Search
CPC ... E03F 5/16; B01D 17/0211; B01D 21/2433; B01D 17/0214; B01D 21/2405; B01D 21/24; B01D 21/245; B01D 21/2461; B01D 21/30; B01D 21/302; B01D 21/02; B01D 2221/02; B01D 17/0208; B01D 17/00; B01D 2201/00; B01D 2201/301; B01D 2201/302; B01D 2201/304; B01D 2201/40; B01D 2201/54; B01D 2201/56; B01D 2221/06

See application file for complete search history.

(56) References Cited

U.S. PATENT DOCUMENTS

| 3,224,593 A | 12/1965 | Nebolsine |
| 3,469,702 A | 9/1969 | Perren |
| 3,628,769 A * | 12/1971 | Lee ...................... F16L 29/007 |
| | | 137/360 |

(Continued)

FOREIGN PATENT DOCUMENTS

DE 199 07 840 8/2000 ............ B01D 17/12

*Primary Examiner* — Dung H Bui
(74) *Attorney, Agent, or Firm* — MacCord Mason PLLC (57) ABSTRACT

A grease trap for separating waste from waste water includes a tank, an inlet in the tank for receiving incoming waste water, a pump discharge for discharge of grease from the tank and a cartridge fitting within the tank. The cartridge includes a pump that is housed in a lower portion of the tank for removing grease from the tank, a plumbing disconnect that provides a communication between the cartridge and the pump discharge when the plumbing disconnect is engaged and optionally terminates the communication if the plumbing disconnect is disengaged and a remote pumper interface distally connected to the pump discharge and including a releasable connection for a pumping truck hose. Methods for separating waste from waste water are also shown and described.

29 Claims, 10 Drawing Sheets

(56) References Cited

U.S. PATENT DOCUMENTS

| | | | | |
|---|---|---|---|---|
| 3,662,918 | A * | 5/1972 | Crawford | B01D 17/0208 210/532.1 |
| 4,147,629 | A * | 4/1979 | Geurtsen | B01D 17/0214 210/104 |
| 4,226,542 | A * | 10/1980 | Black | B03B 9/063 366/1 |
| 4,372,854 | A | 1/1983 | Szereday | 210/242.3 |
| 4,385,986 | A | 5/1983 | Jaisinghani et al. | 210/123 |
| 4,406,789 | A | 9/1983 | Brignon | 210/519 |
| 4,451,366 | A | 5/1984 | Smisson | 210/209 |
| 4,554,074 | A | 11/1985 | Broughton | 210/519 |
| 4,938,878 | A | 7/1990 | Hall | 210/744 |
| 4,965,955 | A * | 10/1990 | Campbell | A01K 63/02 119/201 |
| 4,985,148 | A | 1/1991 | Monteith | 210/519 |
| 5,021,153 | A | 6/1991 | Haws | 210/221.2 |
| 5,178,754 | A | 1/1993 | Batten et al. | 210/138 |
| 5,225,085 | A | 7/1993 | Napier et al. | 210/705 |
| 5,293,887 | A * | 3/1994 | Thibodeaux | B08B 9/093 134/111 |
| 5,378,376 | A | 1/1995 | Zenner | 210/776 |
| 5,405,538 | A | 4/1995 | Batten | 210/744 |
| 5,453,187 | A | 9/1995 | Plumb | 210/202 |
| 5,505,860 | A | 4/1996 | Sager | 210/519 |
| 5,543,064 | A | 8/1996 | Batten | 210/803 |
| 5,560,826 | A | 10/1996 | Szereday et al. | 210/522 |
| 5,565,101 | A | 10/1996 | Kuntz | 210/304 |
| 5,705,055 | A * | 1/1998 | Holloway, Jr. | B01D 17/0208 210/115 |
| 5,714,069 | A | 2/1998 | Sager | 210/519 |
| 5,725,760 | A | 3/1998 | Monteith | 210/170 |
| 5,730,872 | A | 3/1998 | Rhodes | 210/519 |
| 5,746,911 | A | 5/1998 | Pank | 210/170 |
| 5,849,181 | A | 12/1998 | Monteith | 210/163 |
| 5,861,098 | A | 1/1999 | Morrison | 210/774 |
| 5,993,646 | A | 11/1999 | Powers | 210/86 |
| 6,068,765 | A | 5/2000 | Monteith | 210/170 |
| 6,071,420 | A * | 6/2000 | Martinsen | B01D 17/00 210/175 |
| 6,159,361 | A * | 12/2000 | Lapointe | E02B 15/048 210/121 |
| 6,214,220 | B1 * | 4/2001 | Favret, Jr. | B01D 17/00 210/188 |
| 6,238,572 | B1 | 5/2001 | Batten | 210/739 |
| 6,413,435 | B1 | 7/2002 | Kyles et al. | 210/800 |
| 6,517,715 | B1 | 2/2003 | Batten et al. | 210/232 |
| 6,645,387 | B2 | 11/2003 | Naski et al. | 210/744 |
| 6,730,222 | B1 | 5/2004 | Andoh et al. | 210/304 |
| 6,849,176 | B1 | 2/2005 | Batten et al. | 210/97 |
| 6,951,615 | B2 | 10/2005 | Tripodi et al. | 210/744 |
| 6,951,619 | B2 | 10/2005 | Bryant | 210/788 |
| 7,367,459 | B2 | 5/2008 | Batten et al. | 210/521 |
| 7,641,805 | B2 * | 1/2010 | Batten | B01D 21/0042 210/232 |
| 7,828,960 | B1 * | 11/2010 | Batten | B01D 17/0208 210/138 |
| 2001/0025811 | A1 * | 10/2001 | Batten | B01D 17/00 210/143 |
| 2002/0092798 | A1 * | 7/2002 | Dehart | B01D 21/02 209/17 |
| 2005/0016937 | A1 | 1/2005 | Smullen | 210/800 |
| 2005/0061515 | A1 * | 3/2005 | Hopper | B01D 19/0042 166/367 |
| 2005/0205477 | A1 * | 9/2005 | Eriksen | B01D 21/0006 210/97 |
| 2005/0236311 | A1 * | 10/2005 | Terrien | B01D 17/0214 210/188 |
| 2008/0067833 | A1 * | 3/2008 | Quindt | B60J 7/1856 296/121 |
| 2009/0194472 | A1 * | 8/2009 | Jack | B01D 17/0214 210/170.05 |
| 2010/0044379 | A1 * | 2/2010 | Asterlin | F16J 13/22 220/324 |
| 2011/0297626 | A1 * | 12/2011 | Batten | B01D 17/0211 210/800 |
| 2013/0083620 | A1 * | 4/2013 | Hypes | B01D 21/0087 366/136 |
| 2014/0166595 | A1 * | 6/2014 | Baldwin | E03F 5/16 210/799 |

\* cited by examiner

PASSIVE GREASE TRAP WITH LIFT SYSTEM

FIELD

This disclosure relates generally to grease traps for removing grease from waste water, and more particularly, to a passive grease trap for separation and removal of fat, oil and/or grease from an effluent flow.

BACKGROUND

Oil, grease and solid waste contaminant removal or recovery systems are well known in the prior art. Over the past thirty years there has been a steady move towards reducing the contaminants entering the sewage system, such as at food handling facilities, to reduce the grease and solid waste entering the water flows. Sewer system lines can become clogged from the fats, oil and grease waste materials (hereinafter referred to as "F.O.G.") put into the sewer system. This has led more and more sewer authorities to implement F.O.G. control programs and regulations in attempts to remove as much F.O.G. as possible from the effluent flow, thereby releasing only grey water to the sewer system.

Historically, grease traps have been used to meet increasing regulation and control program constraints by, particularly in restaurants and other commercial facilities, limiting the amount of grease and solid waste that is carried into sewer systems via waste water. Typical grease traps are either passive grease traps or automatic, active grease removal traps. Active separators remove F.O.G. from the effluent, typically by some type of skimming operation. Passive grease traps may typically store large amounts of the separated grease and are usually only emptied of the stored waste periodically, and, therefore waste tends to build up inside the tank. Passive grease traps typically include a tank with an inlet that brings in waste water and may contain an outlet that carries water out of the system. The grease is separated from the effluent inside the tank. Lightweight grease rises to the top of the tank and heavier solids settle in the bottom of the tank, where they are stored until they can be removed and the tank emptied.

A problem with many grease traps traditionally is that when influx of large amounts of water is flushed through the system with a large velocity, the grease that has already separated is disrupted, causing the grease to be expelled with grey water. This is especially true as the tank fills up with grease, so that the grease/water interface is closer to the grease trap bottom. Therefore, the idea has been to manage the separation of grease from the water to prevent comingling after separation.

Our prior U.S. Pat. No. 7,367,459 discloses an example of a passive grease trap which can be made economically. It has facilities for catching, separating and holding solids and grease so that they can be pumped out at intervals and has proven to be commercially successful.

However, the storage tanks of such grease traps are often extremely large, located underground, difficult to access and/or inadequately emptied when pumped out. It is to these and other issues that this disclosure is directed.

SUMMARY

The present disclosure fulfills one or more issues in the art by generally providing a grease trap for separating waste from waste water, the trap including a tank having an inlet to receive waste water, a lid covering the tank, a pump discharge for discharge of grease from the tank and a plumbing disconnect and a remote pumper interface may also include a cartridge unit fitting within the tank. The cartridge includes a pump that is housed in a lower portion of the tank for removing grease from the tank. The cartridge may be removable from the tank. The plumbing disconnect provides a communication between the cartridge unit and the pump discharge when the plumbing disconnect is engaged. Optionally, the communication is terminated if the plumbing disconnect is disengaged. The remote pumper interface may be distally connected to the pump discharge and include a releasable connection for a pumping truck hose.

The grease trap may include an outlet in the tank for discharge of outgoing waste water. The grease trap may also include a pump discharge mount within the tank that supports the pump discharge. A disconnect fitting may reversibly establish a communication between the cartridge and the pump discharge. The fitting may include a seal area. The fitting may be extendably and retractably controlled by a handle on the cartridge insert.

The cartridge may be an insert. The cartridge may also include, by way of example, a suction cone with a suction port. The suction port may connect to a suction line that is able to draw separated grease from an upper portion of the tank to a lower portion of the tank. The tank may be divided into upper and lower portions by a baffle around a top portion of the cartridge insert. The baffle may include openings designed to allow grease to separate from the waste water and rise through the openings to be stored in the upper portion of the tank. The openings may narrow toward the apex to discourage grease from returning into the lower portion of the tank. The openings may include cartridge guides around the inner perimeter of the baffle.

The suction port may form a first intake for drawing grease from an upper portion of the tank into a suction line when the grease is to be emptied from the tank. The grease may be drawn to a lower portion of the tank where waste water is combined with the grease at a second intake so that the grease and waste water mixture are together suctioned out of the tank through the pump discharge and to a remote pumper interface by the pumper truck hose.

The grease trap may be activated to push the water mixture through the suction line and toward the pump discharge when a pumper truck hose initiates a suction. The invention also may include a sensor operably able to sense vacuum pressure that is initiated by a pumper truck. An indicator may also be included that signals when a pumper truck hose is suitably connected to the releasable connection.

A control board may be included that recognizes when a vacuum sensor determines a vacuum suction level and also recognizes the signal indicating that a pumper truck hose is suitably connected. The control board may be programmed to initialize a pumping cycle when particular actions are recognized or signals sensed.

The grease trap may, by way of example, be made of roto-molded plastic. The grease trap may also include a washdown system.

The invention may also be considered a method of separating grease from waste water in a grease trap, including in one embodiment, installing a grease trap having an upper chamber and a lower chamber separated by a baffle and having a pump; and passing waste water through the grease tank with the waste water having residence in the tank long enough for the grease to separate from the water. The pump is allowed to suction separated grease from the upper chamber through a suction port and to move the grease through a pump discharge line and pass out of the trap through an engaged plumbing disconnect and pump discharge.

These and other aspects of this disclosure will become apparent to those skilled in the art after a reading of the following description of the preferred embodiment when considered with the drawings.

DETAILED DESCRIPTION OF EXAMPLES

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
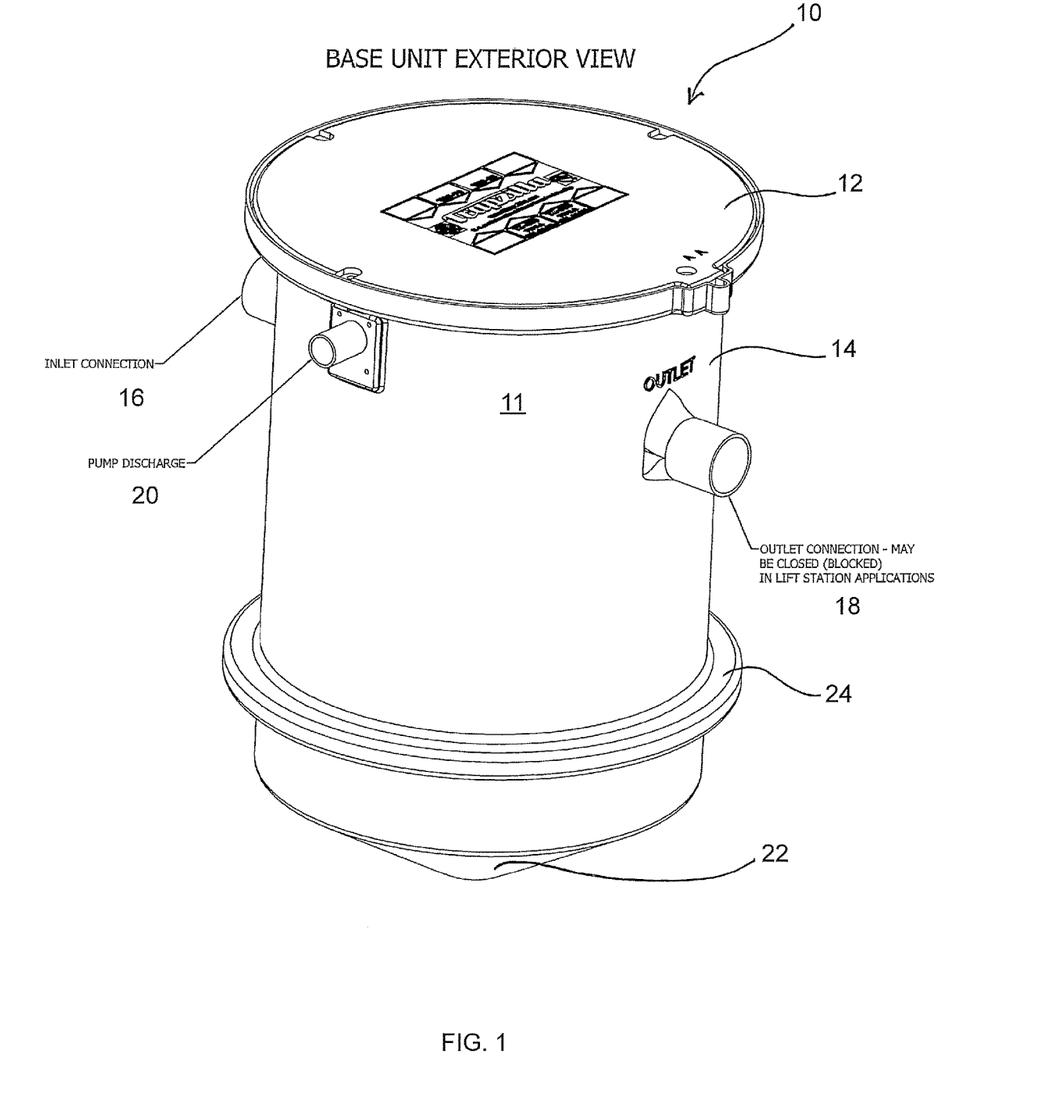
FIG. 1 is a perspective view of one example of a grease trap with a lift system.

It will be understood that the illustrations are for the purpose of describing a preferred example and are not intended to limit the invention thereto. FIG. 1 shows a grease trap 10 for separating solids and grease from waste water. The grease trap 10 includes a tank 11 which may optionally have a downwardly shaped bottom 22. In the tank embodiment including the downwardly shaped bottom 22, the bottom typically may be shaped like an inverted pyramid, however, other shapes such as a conical shape, bowl shape, slanted plane, or the like, can be used. By way of example, the lowermost portion of the bottom of the tank may be centrally located.

FIG. 1 shows an inlet 16 in the tank 11 that is provided for connecting to a waste water source, such as a kitchen sink drain, for allowing waste water to flow into the tank 11. Outlet 18 may be included to allow waste water depleted of grease to exit the tank. Other additional ports, such as a pump discharge 20, may be included to allow for the connection of a pipe through which solids and grease may be removed out of the grease tank 11. Other outlet ports may be provided to vent gases, selectively remove heavy solids from the bottom 22 of the tank 11, or selectively remove grease trapped in the upper chamber.

The grease trap 10 also includes a tank lid 12. An anchor ring 24 may be included to assist with anchoring the trap 10 in a basement floor or other support. While the tank is shown as a cylinder form, it is contemplated that it could take on other shapes and geometry such as rectangular, square, pentagonal, oval, trapezoidal, triangular or free form.

Figure 2:
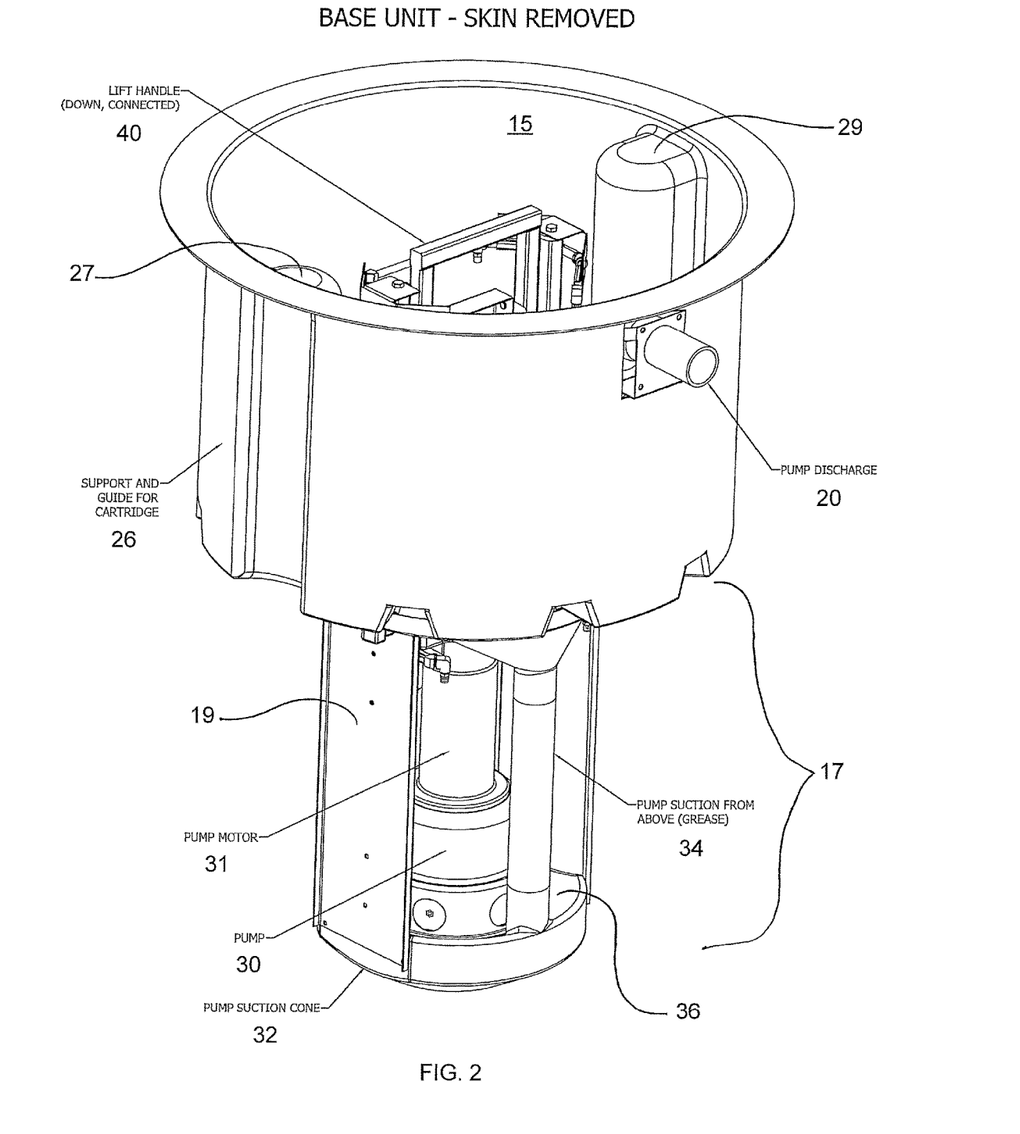
FIG. 2 is a view of an example of the system of FIG. 1 with an outer tank removed.
Figure 3:
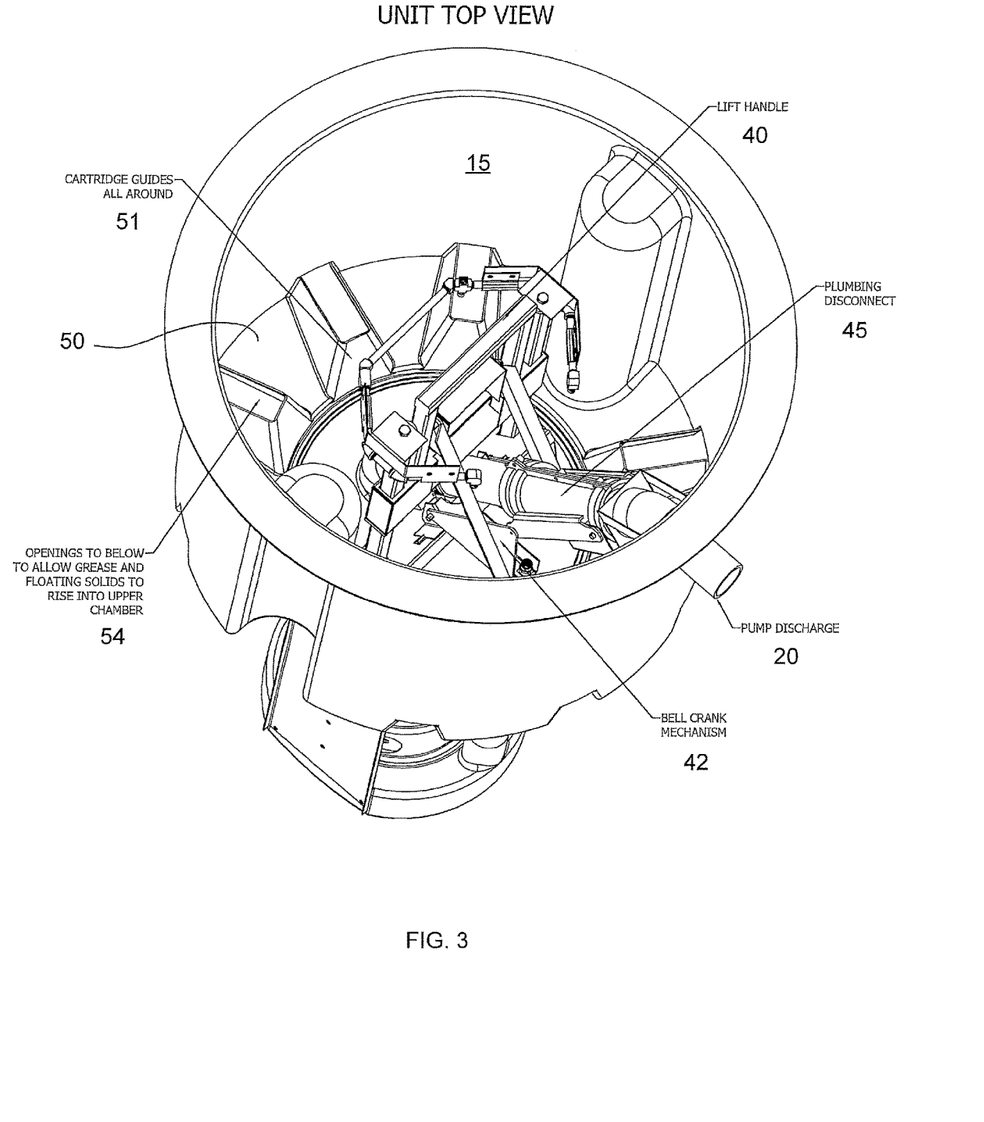
FIG. 3 is a top view of one example of the system as shown in FIG. 2.

FIGS. 2 and 3 show the exemplary trap 10 with the tank 11 removed. A support 26 may fit into the tank 11. The support may include a channel to fit an inlet invert 27 to direct the incoming flow of waste water into the tank downward. An outlet invert 29 channel directs water depleted of grease up and outward as it exits the tank 11 into the sewage system. A baffle 50 (see FIG. 3) may separate the tank into an upper portion 15 above the baffle and a lower portion 17 below the baffle. The baffle may be a part of the support 26 or a separate insert apart from the support. The baffle typically includes one or more baffle openings 54 allowing the grease to rise into the upper chamber portion 15 as it separates from the water in the tank. In one example, the baffle openings 54 are tapered, with a wider opening on the lowest part of the baffle at the lower chamber than above the baffle at the upper chamber. This shaping of the divider openings encourages grease to funnel through from the lower chamber to the upper chamber, however, discourages the separated grease from reentering the lower chamber under normal grease collecting operation. The openings may take on other shapes as well.

In operation, waste water, including grease, enters the trap through inlet connection 16 and may be directed into the lower chamber portion by inlet invert 27. As the grease, less dense that water, begins to separate from the water, it rises within the trap. The lighter weight grease gathers and floats through the divider openings 54, passing from the lower tank portion 17 into the upper tank portion 15. Thus, the collecting grease is moved into the upper portion and sequestered away from the grey water current that typically traverses from the inlet to the trap invert 10 through the outlet invert 29, which accepts water from the lower portion, and directs water to the sewage system via that outlet connection 18. Sequestering the grease above the baffle 50 allows the baffle 50 to shield the grease from being re-entrained into the water flow from the inlet to the outlet 29.

Eventually, as the amount of grease collected increases, the stored grease needs to be emptied from the trap. Since grease traps, especially with larger storage capacities, can be located in areas such as basements or buried, and difficult to access, grease removal and emptying is often a messy, inefficient, time consuming and difficult task that requires the owner's time and attention, even if the actual grease removal is done, as usual, by a third party. When a third party is brought in to empty such a grease trap, often a pumper truck hose must be stretched from the street through the facility and to the difficult to access grease trap. The actual removal of the stored F.O.G. can release smelly vapors and, particularly in a restaurant facility, be unwelcome during the hours of operation. Applicant's invention streamlines the grease removal process so that grease removal is done at a remote pumper interface, away from the actual grease storage tank and thus, minimizes the involvement and inconvenience of all parties.

Figure 4A:
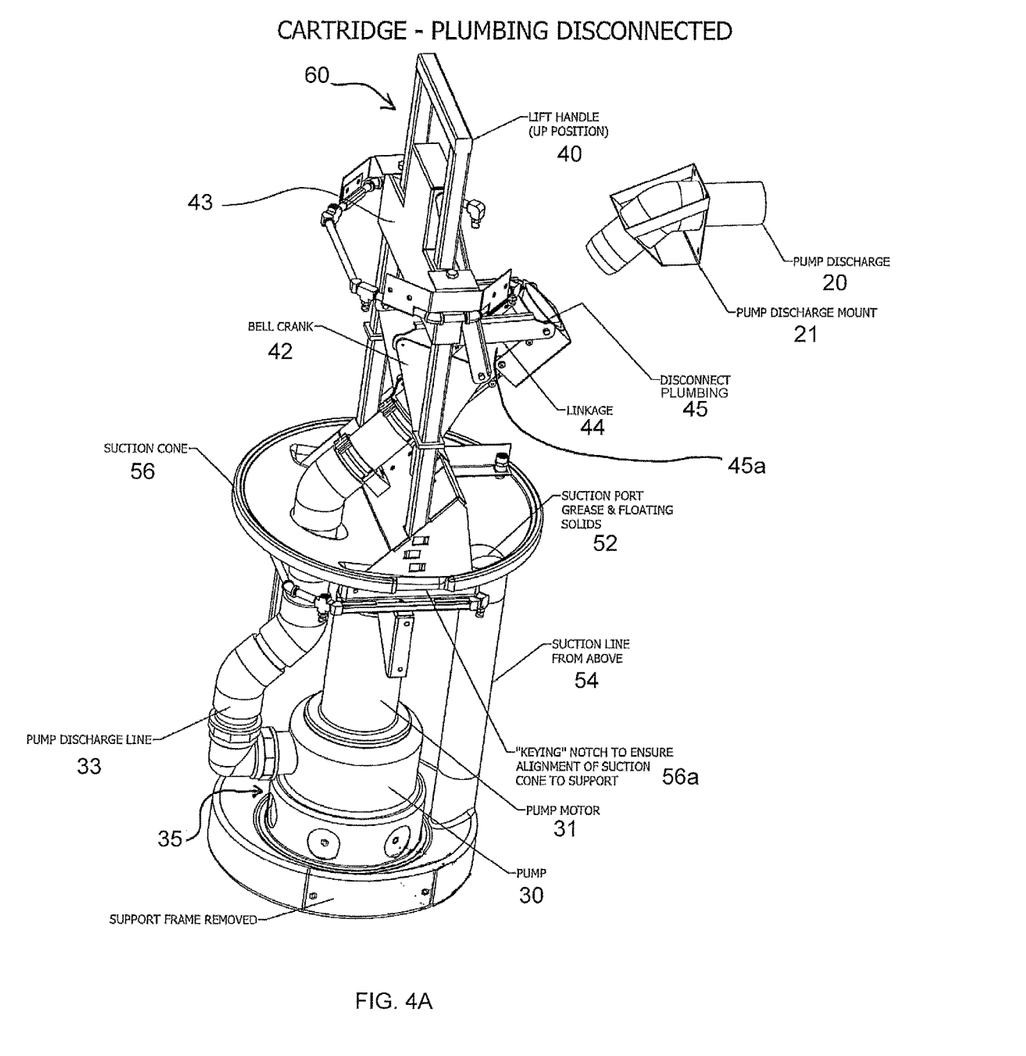
FIG. 4A is a perspective view of one example of a cartridge with one example of a plumbing discharge disconnected.
Figure 4B:
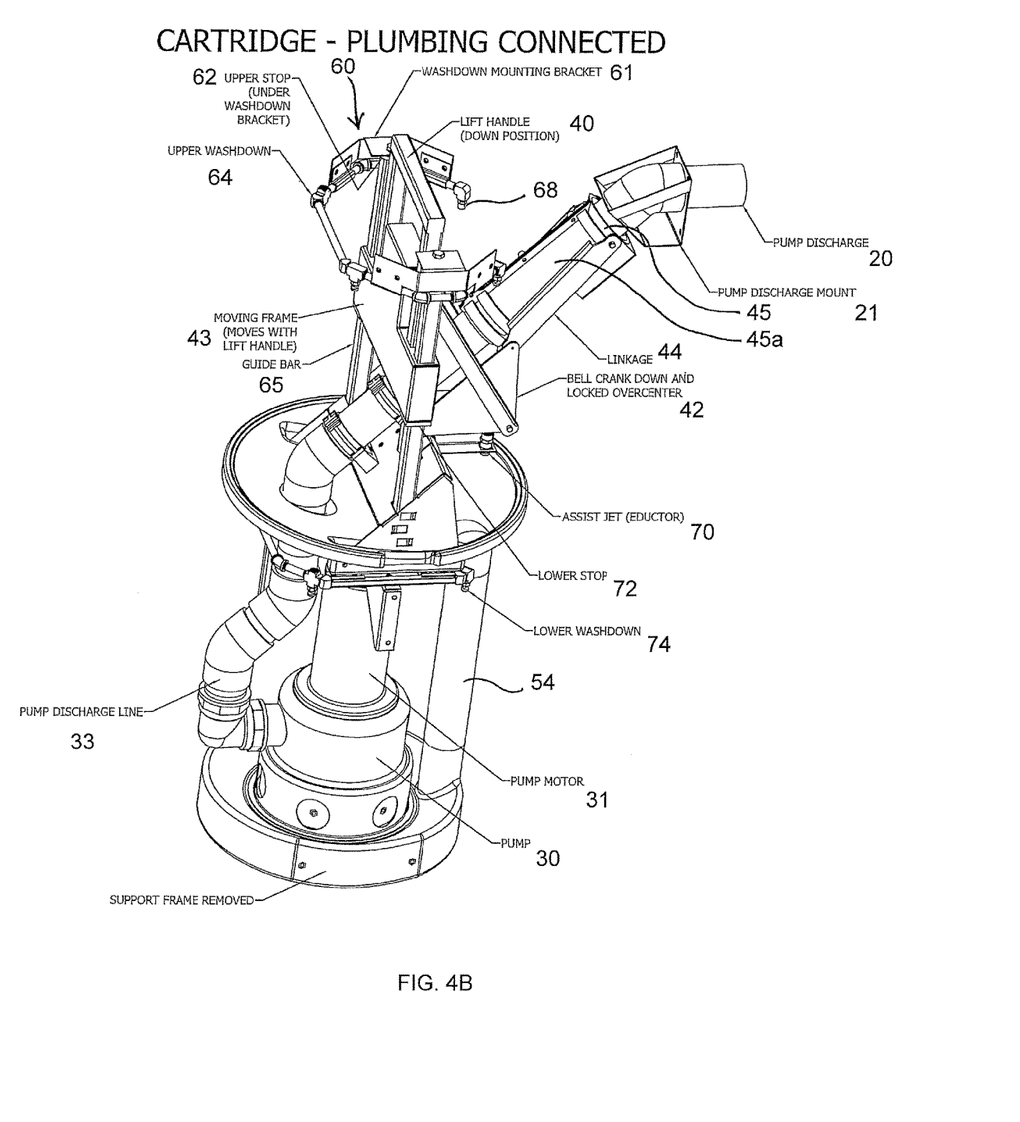
FIG. 4B is a perspective view of one example of a cartridge with one example of a plumbing discharge connected.
Figure 4C:
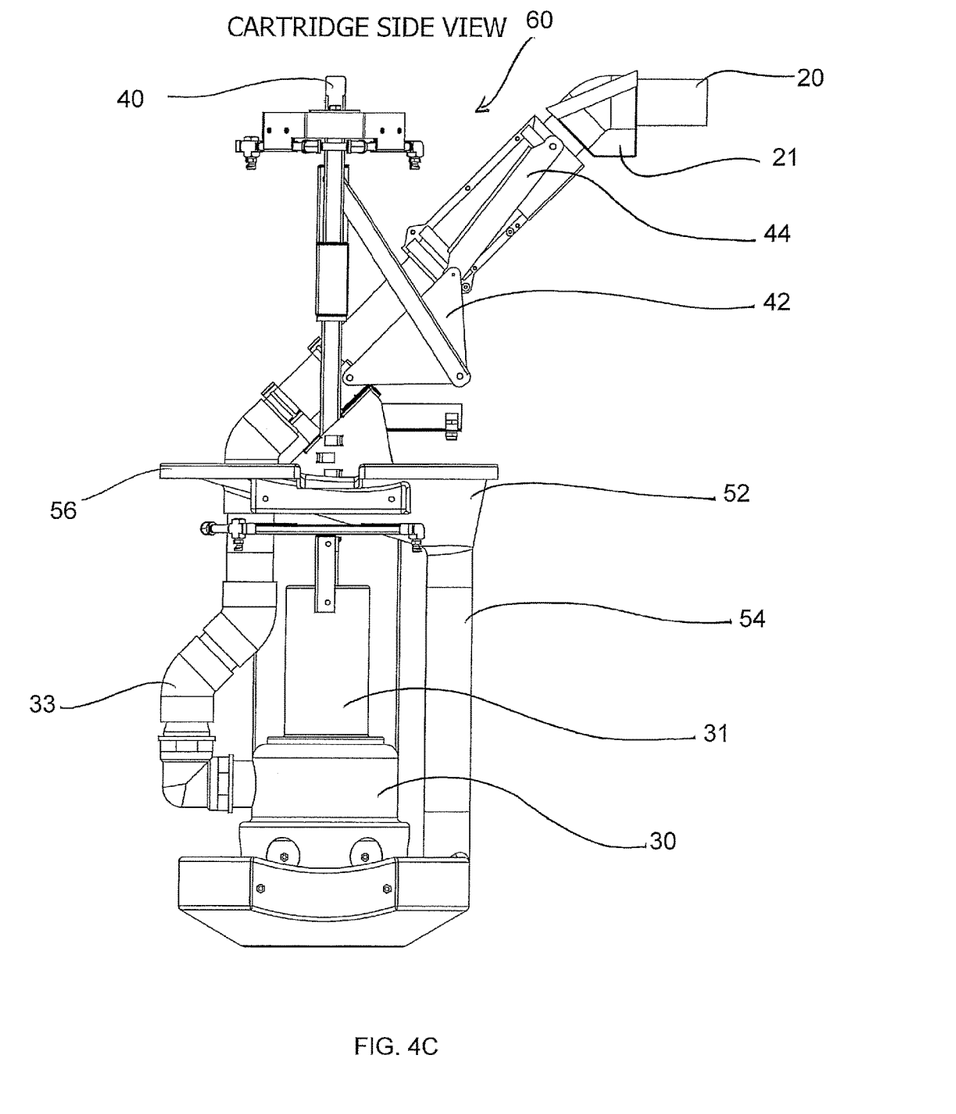
FIG. 4C is a side view of another example of the cartridge.

FIGS. 4A, 4B, and 4C show a cartridge 60 with the tank 11, support 26, and baffle 50 removed. Cartridge 60 fits inside the trap 10 and within or surrounded by the baffle 50. Cartridge 60 includes a pump 30, a plumbing disconnect 45, and a suction cone 56. The cartridge 60 may also include a handle 40. Cartridge 60 may include a support frame 19 (see FIG. 2). Cartridge 60 may be removable from the tank, which is advantageous in the case of needed repairs on parts such as the pump 30.

In one example, cartridge 60 may include a downwardly conical bottom as seen in FIG. 4C so as to nest with a downwardly sloped tank bottom 22. The suction cone 56 is at a height so that it aligns with the baffle 50 so that the baffle fits around the perimeter of the suction cone 56 and creates a barrier between the upper and lower tank portions, except for the baffle openings 54 located on the baffle 50. The baffle openings 54 may include cartridge guides 51, along the inner baffle edge, in order to guide the cartridge into place when it is placed within the trap 10. There is also a suction port 52 located at a low part on the suction cone at a first intake. The suction cone 56 may be entirely downwardly sloped toward the suction port 52 and/or may form a cone shape at the port 52. A key notch 56a may be included at the suction cone and/or the baffle in order to assist in orientation of the cartridge 60 within the baffle 50 and tank 11.

When the cartridge 60 is in place within the tank, the plumbing disconnect 45 aligns with a pump discharge 20 within the tank. The plumbing disconnect provides a pathway between the cartridge and the pump discharge when the plumbing disconnect is engaged and optionally terminates the communication if the plumbing disconnect is disengaged. A pump discharge mount (as seen in FIGS. 4A & 4B) 21 may support the pump discharge 20 inside the tank 11.

Figure 5:
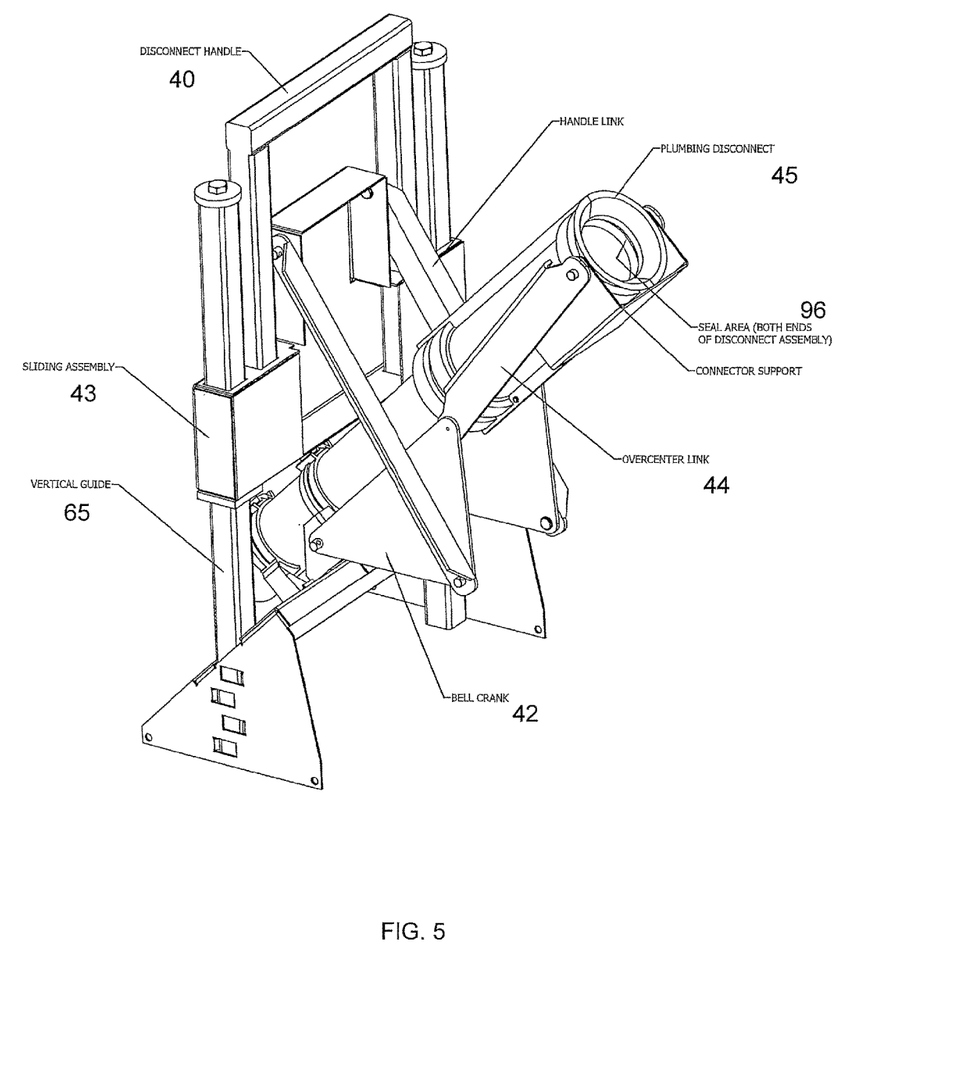
FIG. 5 is a perspective view of one example of a disconnect handle of the cartridge.

In one example, a disconnect 45a may be included for reversibly establishing the communication between the cartridge and the pump discharge. A lift handle 40 may assist in removal and placement of the cartridge 60, however, the lift handle 40 may additionally include a frame 43 for controlling the disconnect fitting 45a. The handle 40 may be pushed down, causing the disconnect fitting 45a to toggle/slide from a retracted position, as seen in FIG. 4A, to an extended position, as seen in FIG. 4B. In one example (as shown in FIG. 5), lowering of the handle 40 unlocks the frame 43 along the guide bar 45, which in turn unlocks the plumbing disconnect fitting 45a by way of turning a bell crank 42 down and locking it over center with a linkage 44 extended. The plumbing disconnect fitting 45a extends from retracted position 45 to meet with a pump discharge 20 which, in turn, is piped to be accessible by the party planning to remove the stored grease at a remote pumper interface 90.

The fitting 45a may include a seal area 80 to assist the closure of the boundary between the plumbing disconnect and the pump discharge. The plumbing disconnect typically remains in communication with the pump discharge unless the cartridge 60 needs to be accessed for mechanical or maintenance reasons, such as servicing the pump. A structure that allows the cartridge 60, particularly the pump, to be removable as a unit has the advantage of allowing the parts most susceptible to needing repairs to be able to be replaced without disturbing the entire trap or its environment. Alternative handle configurations may be used, one example of which is seen in FIG. 5.

In operation, in one example, a pumping truck connects a pumping truck hose to a remote pumper interface and activates a vacuum pump on the track. The remote pumper interface 90 allows the pumping truck hose to connect with the pump discharge 20, which in turn, connects with the plumbing disconnect 45. At installation, a plumber can add a conduit from the pump discharge 20 to the building location where the interface 90 is installed, preferably an exterior location. A vacuum sensor 102 is installed along this line to sense a reduced air pressure caused by the truck's pump and output a signal to the programmable logic controller 100 (see FIG. 7). A vacuum established by the pumping truck hose triggers the pump of the cartridge insert to operate. The vacuum pulls and suctions accumulated grease in the upper portion 15 from the suction port 52 at a first intake and draws it downward through a suction line 54. Waste water is pulled in at a second intake and remixed with the vacuumed grease. The vacuum and the pump 30 pushes the water/grease mixture out of the pump through the pump discharge line 33, carrying the grease out of the tank through the plumbing disconnect 45 and the plumbing discharge 20.

Typically, during grease removal, a vacuum suctions grease out of a grease trap, however, with many traps, the vacuum suction is not strong enough to efficiently remove grease from large containers or from containers located underground. Applicant's invention assists the vacuum removal of grease from the trap by pushing the waste toward the vacuum, essentially assisting the vacuum in removing the accumulated waste. Usually, once grease has been separated from the waste water coming into the storage tank, it is the general thought in the art that efforts should be taken to keep the grease separated from the waste water to achieve a more efficient grease removal. Applicant has discovered however, that remixing water with the separated grease during discharge reduces strain on the pump and provides for efficient grease removal from the tank. The effluent devoid of substantial grease is recombined with the separated grease that may be drawn to a lower portion of the tank and is pumped out of the tank through the discharge line to the pumping truck hose.

In one example, a suction port 52 is included in the cartridge. The suction port may take the shape of a funnel at the suction port or may include the entire, or a portion of, the suction cone 56. The suction port 52 may connect with a suction line 54 that draws separated grease from an upper portion of the tank 15 to a lower portion of the tank 17. There may be an assist jet associated with the suction port 52 so that the assist jet 70 (see FIG. 4B) may be activated to encourage grease to clear the upper portion 15 and to enter suction line 54. The assist jet may, by way of example, act as an educator. The suction port 52 may, in some examples, be considered a first intake. The first intake typically being a location from where the grease is suctioned. The suction line 54 carries the stored grease past a second intake 35 (indirectly shown in FIG. 4A) where waste water is mixed with the grease as the mixture travels through the pump 30 and discharge line 33 toward the pump discharge 20. The pump 30 pushes the mix through the suction line and toward the pump discharge when the pumper truck hose initiates the suction. Therefore, there may be a vacuum suction initiated from the pumper truck hose and a push of the waste from the tank toward the hose via the pump 30. Pulling grease directly from a first intake 52 located a substantial way above the bottom of the tank provides more certainty that it is grease that is being emptied from the tank, opposed to drawing solely water and solid waste from the bottom of the tank. Since the grease has been separated to the top of the tank, water would be emptied first if only a lower intake 35 were included. In many lower-intake-only tanks, grease remains in the tank and, over time, the ratio of grease to water in the tank builds up because water is removed from the tank first, while only a portion of the grease is removed each time. The preferred embodiment avoids that short coming.

Solids stored in the tank may be incorporated into the mixture at the second intake 35 and carried out of the tank along with the mixture. One or more passages at the second intake allow the passage of solids from storage in the tank, out through the pump discharge line 33. Typically, the passages may be around 2 inches in diameter. By allowing a two inch diameter at the passages, the capacity of the passages to handle solids may be matched to the pumping capacity in a 2 inch solids handling pump. In other examples, different diameters may be used at the passages and other capacity pumps may be used. The passage/s at the second intake may be circular, rectangular or take on other geometries. The second intake may be located anywhere, preferably lower in the tank, and usually within lower portion 17. Preferably, the pump is a centrifugal pump.

Figure 6A:
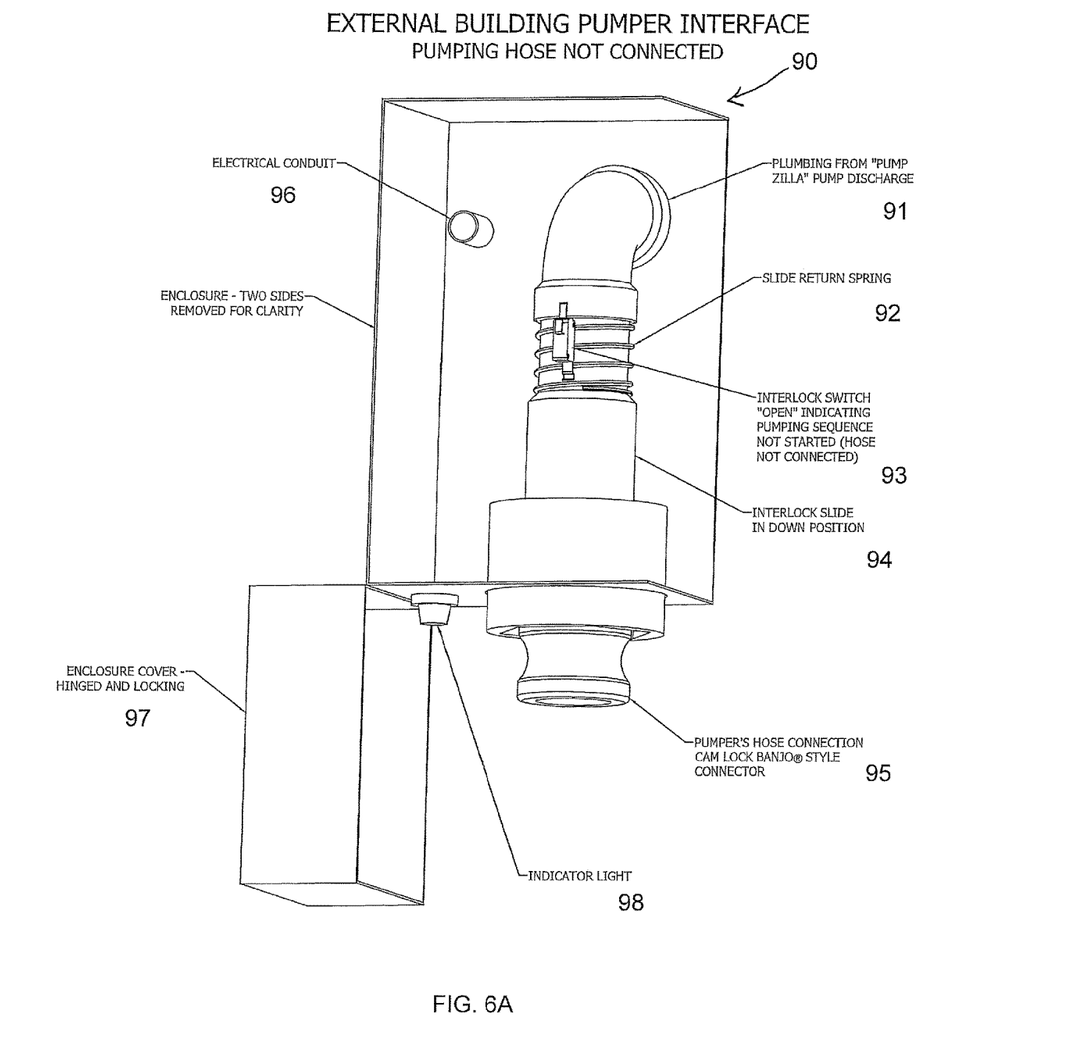
FIG. 6A is a perspective view of one example of a pumper interface.
Figure 6B:
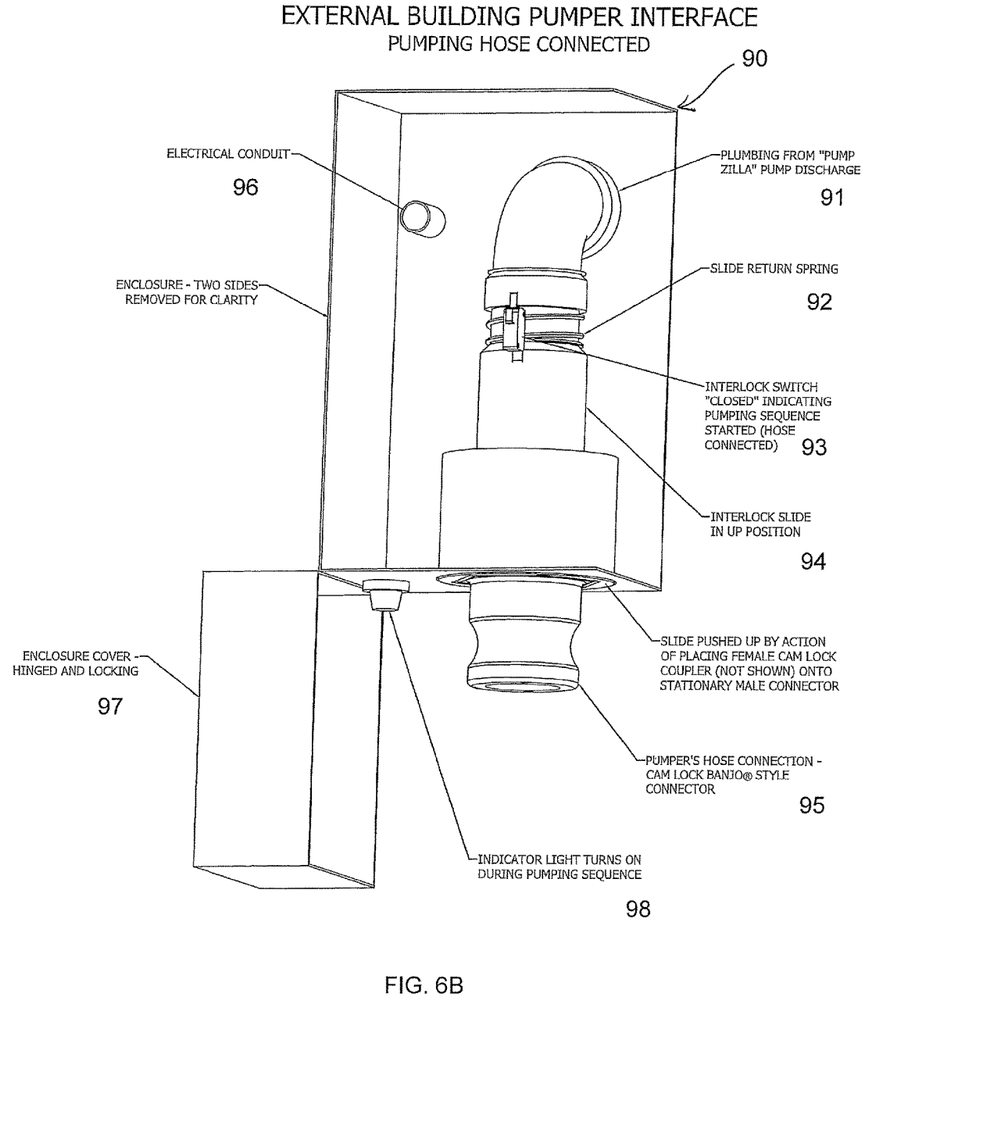
FIG. 6B is a perspective view of one example of a pumper interface when a pumping hose is connected.

The remote pumper interface 90, as seen in FIGS. 6A and 6B, may include an indicator that signals when a pumper truck hose is suitably connected to the releasable connection 95. For example, the indicator signal may be audible or may be a light 98, or both. The remote pumper interface may also include a sliding return spring 92, an interlock slide 94 and an interlock switch 93. The interlock switch 93 is able to sense the position of the interlock slide 94 to signal when a pumping truck hose is securely connected. The position of the interlock slide 94 changes when a pumper truck hose is not attached, as seen in FIG. 6A, and when a pumper truck hose is attached, as seen in FIG. 6B. By way of example, the pumper hose connection may be a cam lock style connector, as exemplified by a cam lock connector from a Banjo® coupling from Banjo Corporation of Cranfordsville, Ind. The interlock switch is able to sense the position of the interlock slide to provide a plumbing unit disconnect signal. The plumbing unit disconnect signal is used to prevent pump operation if a pumper hose connection 95 is not connected to a pumping truck hose.

Figure 7:
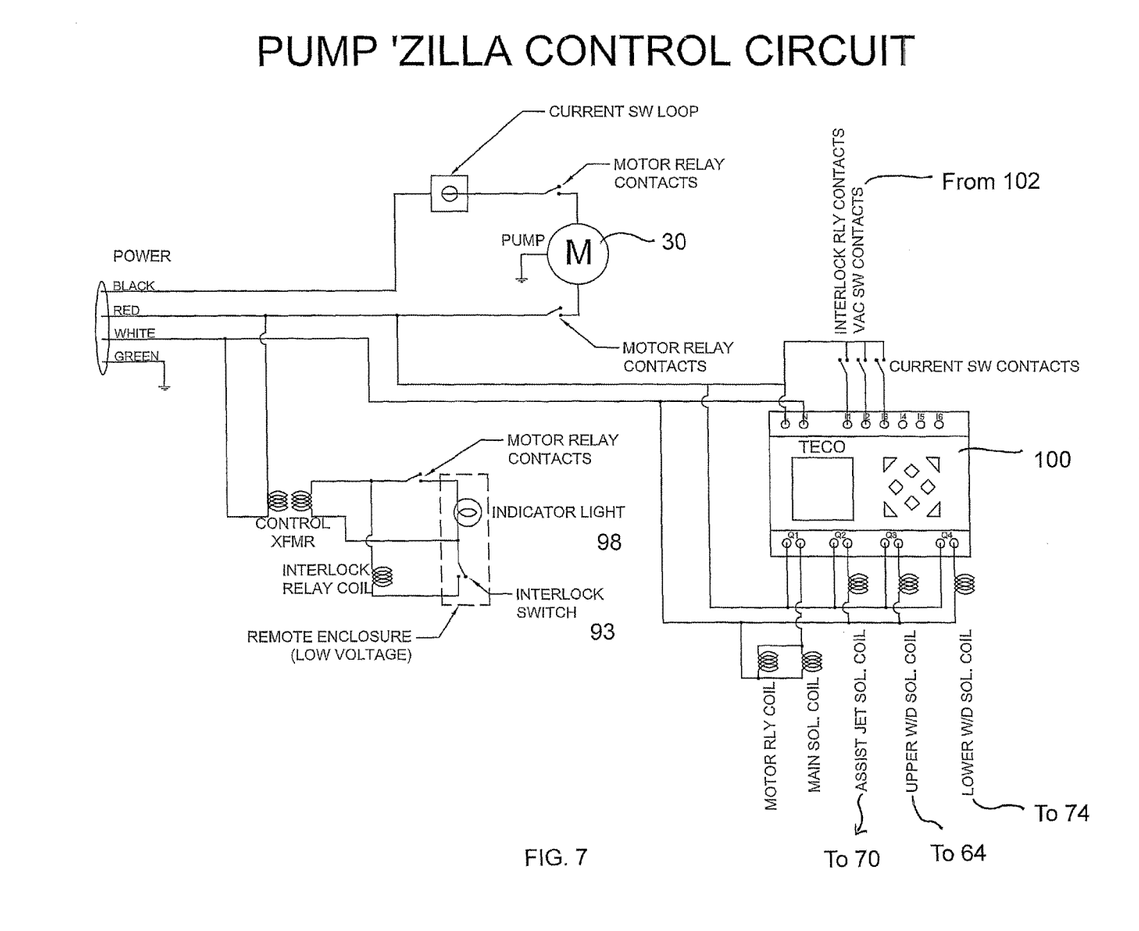
FIG. 7 is a schematic view of one example of a control board of the grease trap of FIG. 1.

The disconnect signal prevents grease and/or water wastes from being pumped out of the trap by pump 30 or discharged when a pump hose is disconnected. As seen in FIG. 7, a control circuit and sensors may be included to direct the action of the pumping cycle and removal of grease and wastes from the tank. When a pumper truck hose securely attaches to the remove pumper interface 90 at the pumper hose connection 95, the interlock switch 93 signals that the connection has been sufficiently made between the hose and the pumper's hose connection 95. An indicator light 98 may activate alerting the pumper that the connection is sufficient and the pumping cycle is about to begin. A vacuum suction is initiated by the pumper. In one example, the vacuum suction and the sensed pumper hose connection triggers the start of the pump 30. Typically, the vacuum will decrease once fluids start moving in the tank, and therefore the signal for the pump to start may be the initial vacuum pressure sensed and not detection of a sustained vacuum pressure. By way of example, the vacuum pressure sensor may be set to be bypassed after an initial vacuum pressure level is sensed in order for a pumping sequence to progress to completion.

The grease trap may include a built-in washdown system. Conventionally, when a pumper empties a grease storage tank, the pumping session will conclude with the pumper washing the tank out to attempt to empty as much of the contents as possible and to clean the tank parts. However, with Applicant's invention, the pumper remotely accesses the tank and never even has to enter a facility to empty the storage tank. Applicant's washdown system may include an upper tank washdown device 64 and a lower tank washdown device 74 as seen in FIG. 4B. The upper and lower tank washdown devices may include washdown valves, controlled by a programmable logic controller 100 seen in FIG. 7. The PLC100 actuates solenoid valves to open or close clearwater connections to the nozzles 68 of the washdown devices. The washdown system may be, by way of example, secured to the tank 11, the cartridge 60, or to the handle 40 as shown in FIG. 4B. The nozzles may spread the water about the upper portion and lower portion of the tank. A washdown cycle may be included at the end of the pumping cycle so that the pumper truck removes a portion or all of the washdown fluids from the tank washdown cycle. Some washdown fluids may be left in the tank.

Certain modifications and improvements will occur to those skilled in the art upon reading the foregoing description. It should be understood that all such modifications and improvements have been omitted for the sake of conciseness and readability, but are properly within the scope of the following claims.

For example, the preferred pump type is a centrifugal pump because it reliably handles the water grease and solids that need to be pumped. The centrifugal pump may re-mix the F.O.G. and water and even generate an emulsion, but at the stage of pumping to a pumper truck, such events are not adverse.

We claim:

1. A grease trap for separating waste from waste water comprising:
    a tank;
    an inlet in the tank for receiving incoming waste water;
    a lid covering the tank;
    a pump discharge for discharge of grease from the tank;
    a for removing grease from the tank;
    a plumbing disconnect that provides a communication between the cartridge and the pump discharge when the plumbing disconnect is engaged and optionally terminates the communication if the plumbing disconnect is disengaged; and
    a remote pumper interface distally connected to the pump discharge and including a releasable connection for a pumping truck hose, wherein the remote pumper interface includes a sliding return spring, an interlock slide and an interlock switch, wherein the interlock switch senses the position of the interlock slide to signal when a pumping truck hose is securely connected.

2. The grease trap of claim 1 including an outlet in the tank for discharge of outgoing waste water.

3. The grease trap of claim 2 wherein the inlet is substantially above the bottom of the tank and the outlet is also substantially above the bottom of the tank and both the inlet and outlet include water guides that direct the water to the bottom of the tank.

4. The grease trap of claim 1 including an inner support.

5. The grease trap of claim 1 including a washdown system.

6. The grease trap of claim 5 wherein the washdown system includes an upper tank washdown device and a lower tank washdown device.

7. The grease trap of claim 1 wherein the interlock switch senses the position of the interlock slide to provide a plumbing unit disconnect signal, the plumbing unit disconnect signal operably connected to the pump to prevent pump operation if a pumper hose connection is not connected to a pumping truck hose.

8. The grease trap of claim 1 including a pump discharge mount.

9. The grease trap of claim 8 wherein the plumbing disconnect includes a disconnect fitting for reversibly establishing the communication between the cartridge unit and the pump discharge.

10. The grease trap of claim 9 wherein the disconnect fitting includes a seal area.

11. The grease trap of claim 9 wherein the cartridge is removable.

12. The grease trap of claim 11 including a lift handle on the cartridge for removing the cartridge.

13. The grease trap of claim 12 wherein the lift handle has a frame for controlling the disconnect fitting.

14. The grease trap of claim 13 wherein the frame includes a bell crank and a linkage.

15. The grease trap of claim 11 wherein the cartridge includes a suction cone.

16. The grease trap of claim 15 wherein the suction cone includes a suction port.

17. The grease trap of claim 16 wherein the suction port connects to a suction line that draws separated grease from an upper portion of the tank to a lower portion of the tank.

18. The grease trap of claim 17 wherein effluent devoid of substantial grease is recombined with the separated grease drawn to a lower portion of the tank and is pumped out of the tank through the discharge line to the pumping truck hose.

19. The grease trap of claim 1 wherein the cartridge includes a first intake having a suction port for drawing grease from an upper portion of the tank into a suction line, a lower intake in a lower portion of the tank for drawing effluent into the suction line, and a pump discharge connected to the suction line so that the pump discharge carries a mix of the grease and effluent out of the tank when a sufficient suction is introduced at the remote pumper interface by a pumper truck hose.

20. The grease trap of claim 19 wherein the pump is activated to push the mix through the suction line and toward the pump discharge when the pumper truck hose initiates the suction.

21. The grease trap of claim 19 including a sensor operably able to determine a preset vacuum suction level initiated by a pumping truck.

22. The grease trap of claim 21 wherein the remote pumper interface includes an indicator that signals when a pumper truck hose is suitably connected to the releasable connection.

23. The grease trap of claim 22 wherein the pump is activated to begin pumping when a pumper truck hose is suitably connected to the releasable connection and the indicator signals that the pumper truck hose is suitably connected.

24. The grease trap of claim 23 including a control board that initializes a pumping cycle when the pump is activated to begin pumping.

25. The grease trap of claim 1 including a baffle having openings, the baffle dividing the tank into an upper and lower portion.

26. The grease trap of claim 25 wherein the openings extend upward into the upper portion of the tank and narrow toward the apex of the opening.

27. The grease trap of claim 26 wherein the openings form cartridge guides around the inner perimeter of the baffle.

28. A grease trap according to claim 25 including a support frame in the lower chamber.

29. A grease trap for separating waste from waste water comprising:
   a tank;
   a pump associated with the tank;
   an inlet in the tank for receiving incoming waste water including a mixture of fats, oil and grease waste materials (hereinafter referred to as "F.O.G.") and grey water and an outlet for grey water from a low part of the tank;
   a separation chamber in the tank allowing F.O.G. to stratify above grey water in the tank;
   a shield in the tank to shield stratified F.O.G. from grey water currents from the inlet to the outlet, the shield including an opening with an F.O.G. discharge line to the pump;
   a pump discharge downstream of the pump for discharge of F.O.G. from the tank; and
   a remote pumper interface for operative connection to the pump discharge and including a releasable connection for a pumping truck hose, wherein the remote pumper interface includes a sliding return spring, an interlock slide and an interlock switch, wherein the interlock switch senses the position of the interlock slide to signal when a pumping truck hose is securely connected,
   whereby in F.O.G. collection status, grey water and F.O.G. can enter the tank, the F.O.G. can stratify above the grey water and as additional incoming waste water enters the tank, grey water can be discharged from the outlet, so that F.O.G. accumulates in the tank and in F.O.G. removal status, a pumping truck hose can be connected to the remote pumper interface and a pump of the pumping truck and the pump associated with the tank can cooperatively pump F.O.G. from the tank.

* * * * *

UNITED STATES PATENT AND TRADEMARK OFFICE
CERTIFICATE OF CORRECTION

PATENT NO. : 9,932,732 B1
APPLICATION NO. : 14/277400
DATED : April 3, 2018
INVENTOR(S) : Batten et al.

Page 1 of 1

It is certified that error appears in the above-identified patent and that said Letters Patent is hereby corrected as shown below:

In the Specification

In Column 4, Line 29, --that-- should be "than"

In Column 4, Line 51, --difficult to access-- should be "difficult-to-access"

In Column 5, Line 56, --track-- should be "truck"

In the Claims

In Column 8, Line 24, after the first word a, --cartridge having a pump-- should be inserted Signed and Sealed this
Twenty-fourth Day of July, 2018

Andrei Iancu
*Director of the United States Patent and Trademark Office*